United States Patent
Cartwright et al.

(10) Patent No.: US 11,685,426 B2
(45) Date of Patent: Jun. 27, 2023

(54) APPARATUS FOR USE IN TURNING STEERABLE VEHICLE WHEELS

(71) Applicant: ZF FRIEDRICHSHAFEN AG, Friedrichshafen (DE)

(72) Inventors: Mark Andrew Cartwright, West Lafayette, IN (US); David Lee Welker, Lafayette, IN (US); Hendrik Wellen, Duesseldorf (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 379 days.

(21) Appl. No.: 17/106,319

(22) Filed: Nov. 30, 2020

(65) Prior Publication Data
US 2022/0169305 A1    Jun. 2, 2022

(51) Int. Cl.
*B62D 5/04*    (2006.01)

(52) U.S. Cl.
CPC ......... *B62D 5/0448* (2013.01); *B62D 5/0409* (2013.01)

(58) Field of Classification Search
CPC ...... B62D 5/04; B62D 5/0409; B62D 5/0442; B62D 5/0445; B62D 5/0448; B62D 5/0451
See application file for complete search history.

(56) References Cited

U.S. PATENT DOCUMENTS

| | | | | |
|---|---|---|---|---|
| 6,065,561 | A * | 5/2000 | Howard | B62D 7/224 91/375 A |
| 2012/0241243 | A1* | 9/2012 | Zaloga | B62D 3/08 180/444 |
| 2012/0241244 | A1* | 9/2012 | Escobedo | B62D 5/0421 180/444 |
| 2018/0244305 | A1* | 8/2018 | Cai | F16H 25/2214 |
| 2020/0070879 | A1* | 3/2020 | Kim | B62D 15/021 |
| 2021/0309286 | A1* | 10/2021 | Kern | B62D 3/08 |
| 2022/0032991 | A1* | 2/2022 | Pattok | B62D 5/0454 |

FOREIGN PATENT DOCUMENTS

KR    20200097414 A * 8/2020    ............... G12B 5/00

* cited by examiner

*Primary Examiner* — Barry Gooden, Jr.
(74) *Attorney, Agent, or Firm* — Tarolli, Sundheim, Covell & Tummino L.L.P

(57) ABSTRACT

An apparatus for use in turning steerable vehicle wheels includes a rotatable output shaft. A first rotational input assembly is provided for transmitting a steering command from a steering control member to the output shaft. A power transmitting mechanism is configured to transmit the rotational force from the input assembly to the output shaft. The power transmitting mechanism includes a plurality of sector gears. A ball screw has longitudinally separated first and second ball screw ends. A ball nut has a plurality of rack gears. Rotational force from the input assembly turns the ball screw, and the ball nut reciprocates within the housing responsive to rotation of the ball screw to move each of the plurality of rack gears in a longitudinal direction. Longitudinal motion of the rack gear teeth responsively drives the sector gear teeth to transmit the steering command to the output shaft.

12 Claims, 3 Drawing Sheets

APPARATUS FOR USE IN TURNING STEERABLE VEHICLE WHEELS

TECHNICAL FIELD

The present invention relates to an apparatus for use in turning steerable vehicle wheels and, more specifically, to a power steering apparatus for use in turning steerable wheels of a vehicle.

BACKGROUND

A known vehicle steering apparatus includes a steering member which is axially movable to effect turning movement of steerable vehicle wheels, particularly for a commercial vehicle such as a heavy truck. A steering column and intermediate shaft connect the vehicle steering wheel to a steering gearbox. The gearbox input shaft is connected to a ball screw, which displaces a position of a rack nut. The rack nut teeth are meshed with the output shaft sector teeth. Motion of the steering member is controlled by an input unit transmitting operator commands from a steering wheel or other operator input device. Example power vehicle steering apparatuses are disclosed in U.S. Pat. Nos. 8,567,554 and 8,360,197, both of which are incorporated by reference herein.

SUMMARY

In an aspect, an apparatus for use in turning steerable vehicle wheels is provided. A rotatable output shaft is selectively rotatable to effect turning movement of at least one vehicle wheel. A housing supports the output shaft for rotation relative thereto about a shaft axis. A first rotational input assembly is provided for transmitting a steering command from a steering control member to the output shaft. A power transmitting mechanism is located within the housing and is configured to transmit the rotational force from the input assembly to the output shaft. The power transmitting mechanism includes a plurality of sector gears. Each sector gear is operatively connected to the output shaft at a lateral spacing from each other. Each sector gear includes at least one sector gear tooth. A ball screw has longitudinally separated first and second ball screw ends. A ball nut has a plurality of rack gears. Each rack gear is operatively connected to the ball nut at a lateral spacing from each other. Each rack gear includes at least one rack gear tooth configured for selective engagement with a corresponding sector gear tooth. The ball nut is operatively engaged with the ball screw. Rotational force from the input assembly turns the ball screw, and the ball nut reciprocates within the housing responsive to rotation of the ball screw to move each of the plurality of rack gears in a longitudinal direction. Longitudinal motion of the rack gear teeth responsively drives the sector gear teeth and thereby transmits the steering command to the output shaft through toothed engagement between each rack gear and a corresponding sector gear.

BRIEF DESCRIPTION OF THE DRAWINGS

For a better understanding, reference may be made to the accompanying drawings, which are not to scale unless explicitly noted as such in the below description, and in which.

DESCRIPTION OF ASPECTS OF THE DISCLOSURE

Unless defined otherwise, all technical and scientific terms used herein have the same meaning as is commonly understood by one of skill in the art to which the present disclosure pertains.

As used herein, the singular forms "a," "an" and "the" can include the plural forms as well, unless the context clearly indicates otherwise. It will be further understood that the terms "comprises" and/or "comprising," as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first," "second," etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

The invention comprises, consists of, or consists essentially of the following features, in any combination.

Figure 1:
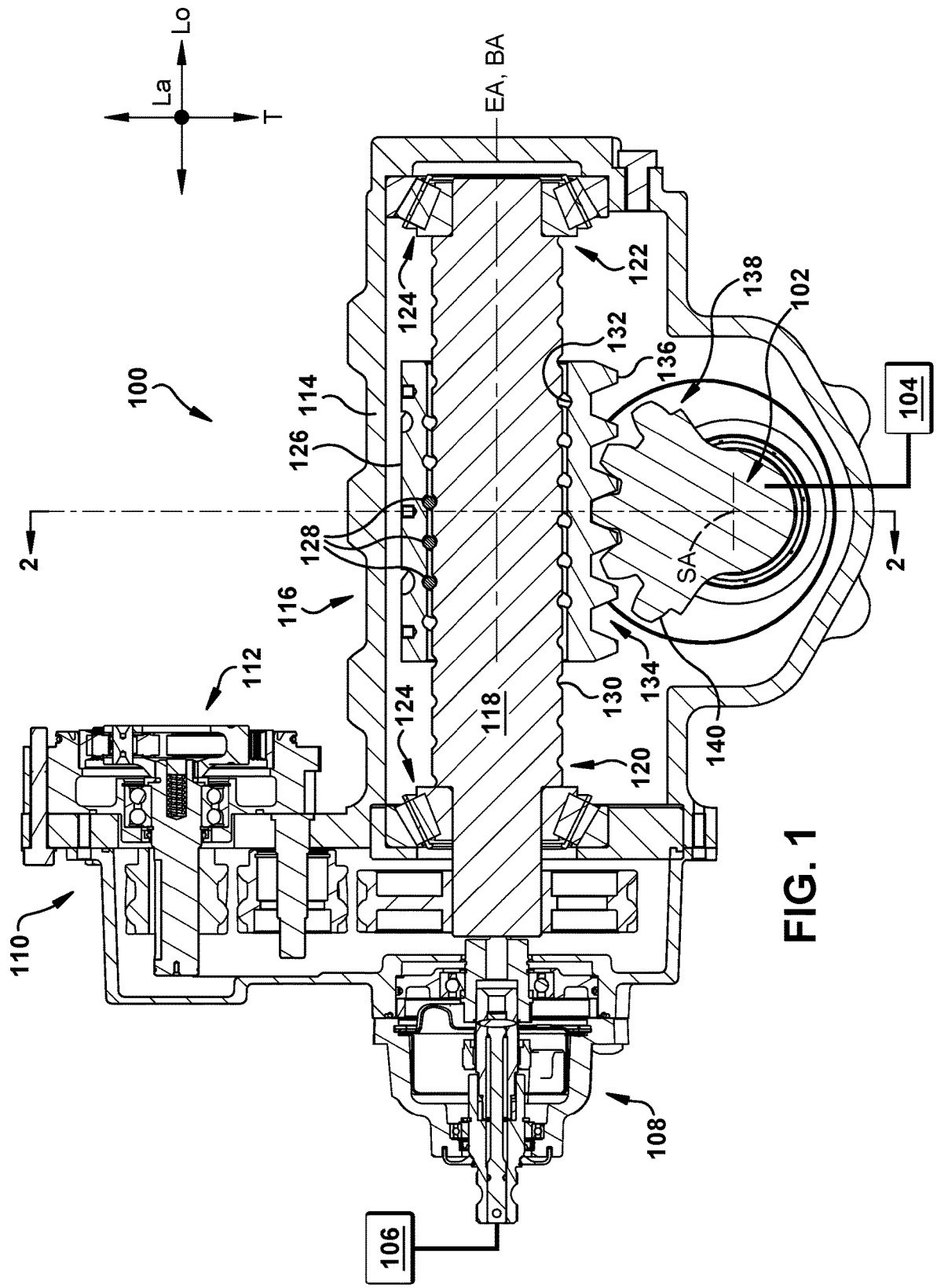
FIG. 1 is a partial front view of an electric power steering apparatus.

FIG. 1 depicts a power steering apparatus 100 for use in turning steerable vehicle wheels, including a laterally extending output shaft 102 that is selectively rotatable about a shaft axis SA to effect turning movement of at least one vehicle wheel (shown schematically at 104). An electric power steering apparatus 100 is described herein as an example use environment, but it is contemplated that the described components could also or instead be used with a mechanical or electromechanical power steering apparatus (not shown). The "lateral" direction, as referenced herein, is used throughout to indicate a direction "La" which is substantially parallel to the shaft axis SA; i.e., into and out of the plane of the page as depicted in the orientation of FIG. 1. A steering member (e.g., a steering wheel, shown schematically at 106) is manipulable by a vehicle operator to provide a steering command for responsive movement of the output shaft 102.

The steering command may be transmitted from the steering member 106, or from any other steering command origination (e.g., an autonomous vehicle component), to the output shaft 102 through the use of a first rotational input assembly 108. The first rotational input assembly 108 is shown in the Figures as being an input shaft module with a torque angle sensor, but one of ordinary skill in the art will be able to provide an appropriate first rotational input assembly 108.

A second rotational input assembly (shown schematically at 110 in FIG. 1 as an electronic power pack) may be operatively connected with the output shaft 102. The second rotational input assembly 110 includes a motor, which can be an electric drive motor 112, for generating an electrically provided rotational force to indirectly power motion of the output shaft 102. That is, the second rotational input assembly 110 is operable to apply an electrically provided rotational force from the electric drive motor 112 to the output shaft 102. One of ordinary skill in the art can readily provide mechanical and/or electrical connections between each of the first and second rotational input assemblies 108 and 110 and the other components described and shown herein for a particular use environment of the present invention.

A housing 114 supports the output shaft 102 for rotation relative thereto about shaft axis SA. The housing 114 also serves to at least partially enclose and protect other components of the electric power steering apparatus 100 as discussed below, and to help provide a parts "package" which can be easily stocked and manipulated by manufacturing and repair personnel. It is contemplated that the housing 114 could be supplied in a modular manner with "standard" connections for outside components. Such a modular configuration would facilitate selective connection of first and second rotational input assemblies 108 and 110 having chosen properties for a particular use environment and thus facilitate customization of the electric power steering apparatus 100 as desired.

In the depicted example use environment, the first rotational input assembly 108 provides a small rotational force indicative of the direction and magnitude of the steering command issued by a human or automated driver. The second rotational input assembly 110 may provide electrically-powered steering assistance in response to the steering command-based rotational input from the first rotational input assembly 102 to a level which is mechanically sufficient to achieve the desired effect of moving the steerable shaft 102 and thus turn the vehicle wheels 104.

As will be discussed in greater detail below, this process (of transmitting and translating an incoming steering command to vehicle wheel turning motion) is assisted by a power transmitting mechanism (shown generally at 116) which is located within the housing 114. The power transmitting mechanism 116 is configured to transmit the electrically provided rotational force from the electric drive motor 112 to the output shaft 102 responsive to the steering command. More specifically, the power transmitting mechanism 116 translates power from the electric drive motor 112 (which can be more generally considered to be a type of an "input rotator"), having an electric drive effective axis EA (i.e., input rotator axis EA), to the shaft axis SA, which is perpendicular to, and transversely offset from, the electric drive effective axis EA. The "transverse" direction, as used herein, is substantially perpendicular to the lateral direction and is shown as the up-and-down direction "T" in the orientation of FIG. 1.

The input rotator represents a direction- and/or magnitude-shifted version, when present, of the straight electric drive motor 112 output—for example, provided through the use of a gearbox connected to the electric drive motor 112. It is contemplated, though, that the electric drive motor 112 could provide power directly along electric drive effective axis EA to other components of the power transmitting mechanism 116 as desired for a particular use environment. In other words, an "input rotator" could represent either a single, standalone electric drive motor component or a combination of an electric drive motor component and a direction- and/or magnitude-shifting mechanism, without restriction.

As depicted in FIG. 1, a ball screw 118 has longitudinally separated first and second ball screw ends 120 and 122 and defines ball screw axis BA, about which the ball screw 118 selectively rotates. The term "longitudinal" is used herein to indicate direction "Lo", substantially perpendicular to both the lateral and transverse directions, and shown as the side-to-side direction in the orientation of FIG. 1. In the depicted configuration, the ball screw 118 is supported at both the first and second ball screw ends 120 and 122, and rotatably attached to the housing 114, by bearing mounts 124. However, the ball screw 118 and related mechanisms could be configured and provided in any desired manner. Again as shown here, the ball screw 118 may extend collinearly with the input rotator (represented by electric drive effective axis EA in FIG. 1). It is also contemplated that, in other configurations, an electric drive output shaft could be directly attached to the first and/or second ball screw ends 120 and 122 for direct driving thereby. For ease of description, ball screw axis BA will be considered to be coincident with electric drive effective axis EA in FIG. 1.

A ball nut 126 is operatively engaged with the ball screw 118. At least one ball 128 is interposed between an external helical raceway 130 of the ball screw 118 and an internal helical raceway 132 of the ball nut 126 for transmitting forces therebetween. In this manner, the ball nut 126 can translate longitudinally with respect to, and powered by, a rotating ball screw 118 while maintaining a substantially constant rotational position with respect to ball screw axis BA.

Figure 2:
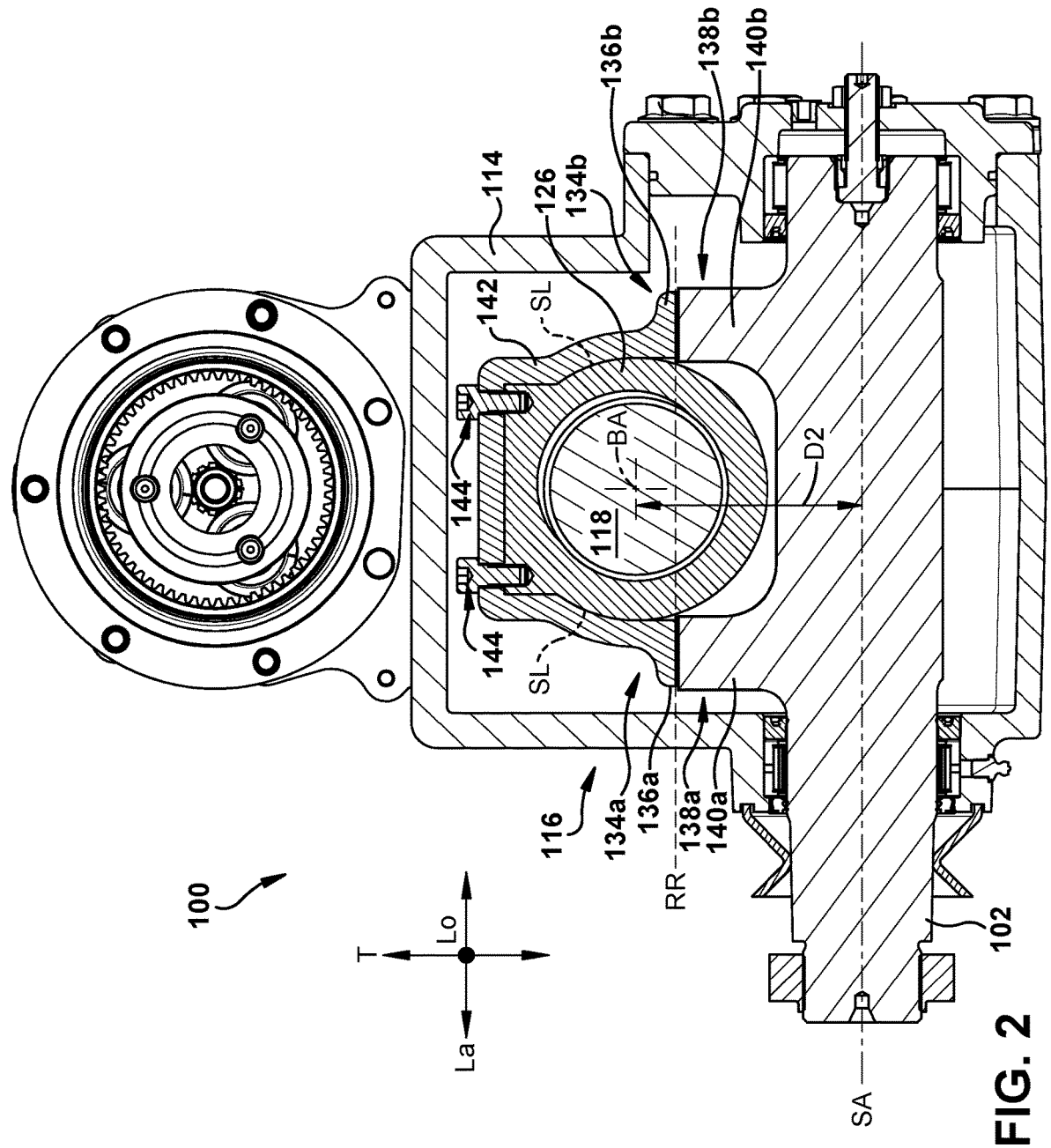
FIG. 2 is a partial side view of the electric power steering apparatus of FIG. 1.
Figure 4:
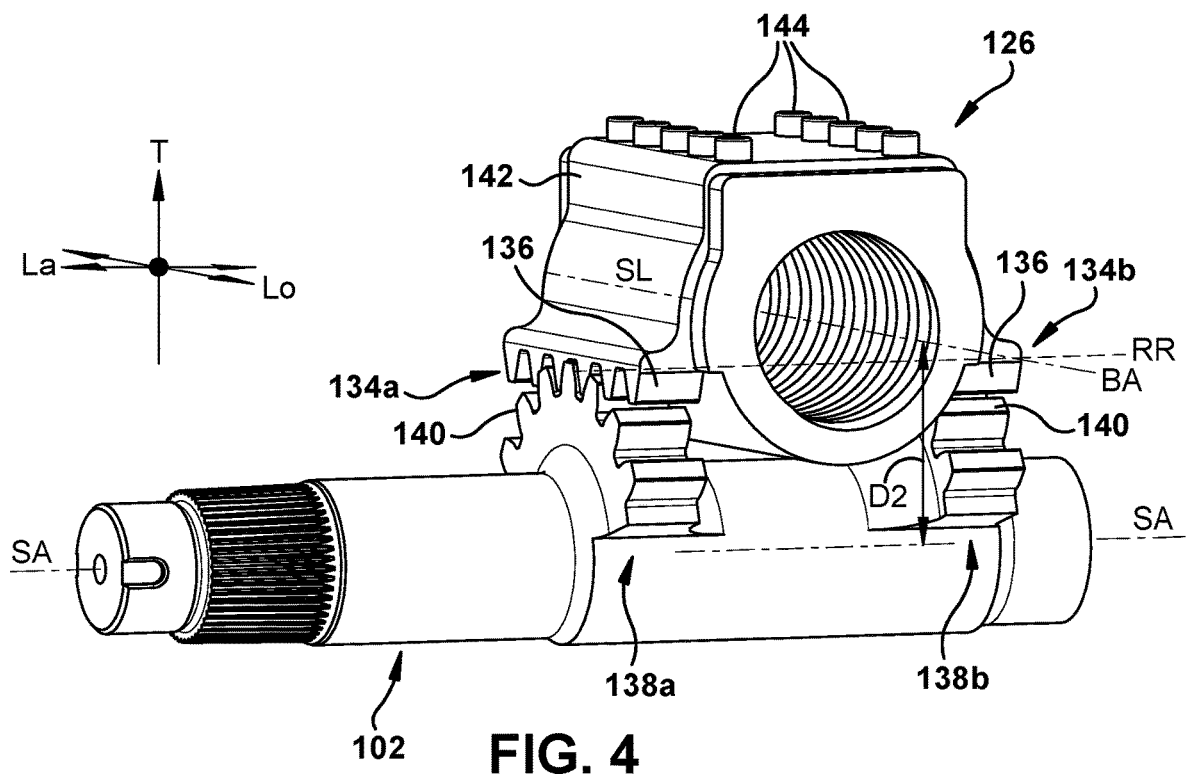
FIG. 4 is a partial perspective view of a component of the electric power steering apparatus of FIG. 1.

The ball nut 126 has a plurality of rack gears (one shown at 134 in FIG. 1, first and second rack gears shown at 134*a* and 134*b*, respectively, in FIGS. 2 and 4). Each rack gear 134 is operatively connected to the ball nut 126 at a lateral spacing from each other rack gear 134. Each rack gear 134 includes at least one rack gear tooth 136.

The power transmitting mechanism 116 also includes a plurality of sector gears (one shown at 138 in FIG. 1, first and second sector gears shown at 138*a* and 138*b*, respectively, in FIGS. 2 and 4). Each sector gear 138 is operatively connected to the output shaft 102 at a lateral spacing from each other sector gear 138. Each sector gear 138 includes at least one sector gear tooth 140.

At least one rack gear tooth 136 is configured for selective engagement with a corresponding sector gear tooth 140 to rotate the output shaft 102 responsive to the steering command. That is, rotational force from the input rotator (here, electric drive motor 112) turns the ball screw 118. The ball nut 126 reciprocates within the housing 114 responsive to rotation of the ball screw 118 to move each of the plurality of rack gears 134 in a longitudinal direction. As a result, longitudinal motion of the rack gear teeth 136 responsively drives the sector gear teeth 140 and thereby transmits the steering command to the output shaft 102 through toothed engagement between each rack gear 134 and a corresponding sector gear 138.

Figure 3:
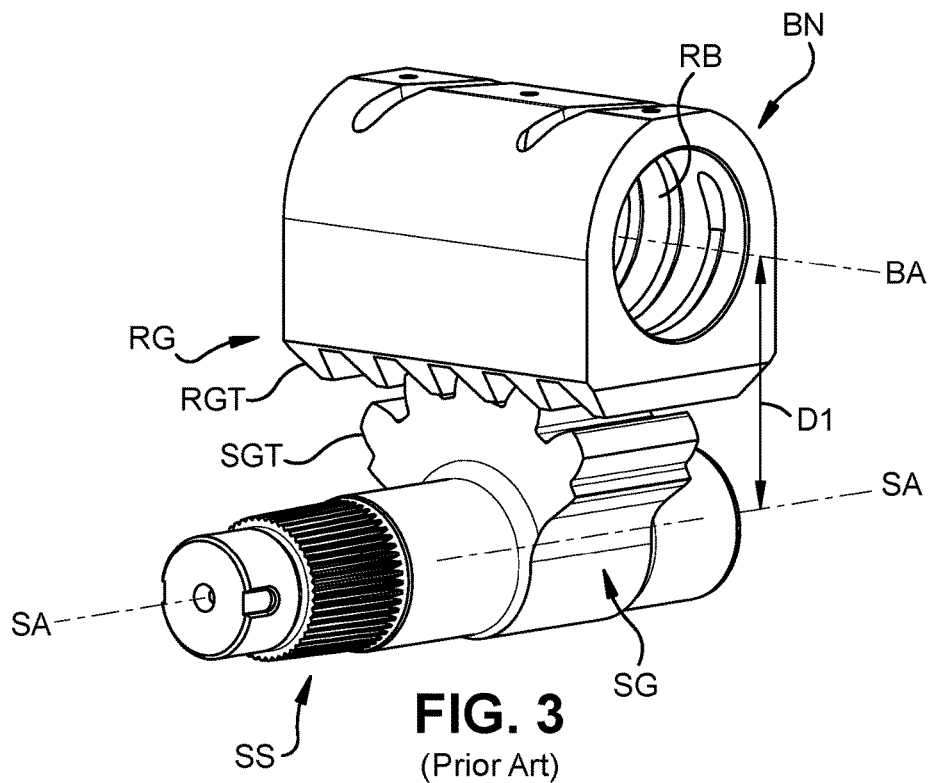
FIG. 3 is a partial perspective view of a component of a prior art power steering apparatus.

FIG. 3 is a perspective view of a prior art ball nut BN and output shaft SS. As is readily apparent from FIG. 3, the prior art ball nut BN includes a single rack gear RG, including a plurality of rack gear teeth RGT, extending across the bottom of the ball nut BN. The prior art output shaft SS shown in FIG. 3 includes a single sector gear SG, including a plurality of sector gear teeth SGT, which are likewise relatively thick in the lateral direction La to engage with the rack gear teeth RGT. The prior art ball screw is not shown here, but would, in practice, extend longitudinally through the rack bore RB. As can be seen, the box center distance—a measurement of the transverse distance between the ball screw axis BA and the perpendicular output shaft axis SA—has a length D1 for the prior art ball nut BN and output shaft SS.

In contrast, FIG. 4—depicting a component of the electric power steering gear 100 of FIG. 1—clearly shows a output shaft 102 having a plurality of sector gears 138 in operative and toothed engagement with a ball nut 126 having a plurality of rack gears 134. Two rack gears 134 and two sector gears 138 are depicted in at least FIGS. 2 and 4, by way of example. However, it is contemplated that any desired number of rack gears 134 and/or sector gears 138 could be provided for a particular use environment of the electric power steering apparatus 100. It is also contemplated that, when more than two rack gears 134 and/or sector gears 138 are provided to a single electric power steering apparatus 100, at least one of the rack gears 134 and/or sector gears 138 could be left idle (i.e., not toothedly engaged with another component during operation) as desired.

For example, a single output shaft 102 could include three or more laterally arranged sector gears 138, each of which could optionally include differently configured sector gear teeth 140 from at least one other sector gear, and only a selected two of the three or more sector gears 138 would be meshed with corresponding rack gears 134 during operation of the electric power steering apparatus 100. In this example, a variety of differently configured rack gears 134 could be used in different, predetermined combinations with a single output shaft 102, to reduce the number of separately configured output shafts 102 which a manufacturer, distributor, repair center, or other stockiest would need to carry in inventory. The ball nut 126 could be similarly provided with a variety of more than two rack gears 134, for similar inventory-reduction reasons.

Similarly, whether there are two or more rack gears 134 and sector gears 138 in the electric power steering apparatus 100, each may have desired dimensions and configurations. It is contemplated, though, that—for most use environments—the tooth pitches, pressure angles, tooth thicknesses (in the longitudinal and/or transverse directions), and other tooth properties can be predetermined for both the rack gear teeth 136 and sector gear teeth 140 will be chosen to facilitate effective driving/driven contact between the totality of teeth for a particular electric power steering apparatus 100.

With that in mind, however, it should be noted that the rack gears 134 and sector gears 138 could have different dimensions or thicknesses in the lateral direction than other rack gears 134 and/or sector gears 138 of the same electric power steering apparatus. That is, a selected rack gear 134a may have a different lateral dimension than an other rack gear 134b, and/or a selected sector gear 138a may have a different lateral dimension than an other sector gear 138b, as desired. This may be useful, for example, for distributing torque or other developed forces in the gearing system in a desired manner.

With reference now to the box center as shown in FIG. 4, the transverse distance between the ball screw axis BA and the perpendicular output shaft axis SA—has a length D2 as shown in the combination of the ball nut 126 and output shaft 102 of the electric power steering apparatus 100 described and shown herein. Though at least FIGS. 3-4 are not shown to scale here, the distance D2 of FIG. 4 may be less than the distance D1 of FIG. 3 for similarly dimensioned ball nuts and output shafts as desired for a particular use environment, since the ball screw 118 of the described electric power steering apparatus 100 is able to "nestle" down in between the two rack gears 134 of the ball nut 126 in a way which is not possible in the prior art device. Stated differently, in the electric power steering apparatus 100, at least a portion of the ball screw 118 is interposed laterally between at least a portion of each of the plurality of rack gears 134, as shown by rack gear tooth 136 root-to-root line RR in FIG. 4. In the prior art device of FIG. 3, in contrast, a similarly "nestled down" ball screw would protrude from the "bottom" of the ball nut BN and interfere with the engagement between the rack gear teeth RGT and the sector gear teeth SGT, if the distance D1 were reduced to a value reflecting D2 of corresponding components as arranged in the embodiment shown in FIG. 4.

Again with reference to FIG. 4, the rack gears 134 can be provided to the ball nut 126 in any desired manner. For example, at least one rack gear 134 of the plurality of rack gears may be integrally formed as a single unitary component with the ball nut 126 (e.g., via forging, molding machining, or otherwise manufactured as a single-piece component).

Alternately, and as is the case in the example components shown in FIG. 4, at least one rack gear 134 of the plurality of rack gears is provided on a ball sleeve 142 that at least partially surrounds an outer circumference of the ball nut 126. Here, both the first and second rack gears 134a and 134b protrude downward from a ball sleeve 142 that extends partially around the outer circumference of the ball nut 126, but does not completely encircle the ball nut 126. The depicted ball sleeve 142 is attached to the ball nut 126 in any desired manner (shown here by at least one fastener 144) to secure the rack gears 134 to the ball nut 126. Using an arrangement as shown in FIG. 4, any desired rack gear 134 configuration(s) could be provided for a particular use environment without requiring a corresponding variety of ball nuts 126. Instead, a single "universal" ball nut 126 could be provided, with a ball sleeve 142 having appropriately configured rack gears 134 attached to achieve a desired arrangement for the electric power steering apparatus 100.

It is also contemplated, as depicted schematically by sleeve line SL in FIG. 4, that the ball sleeve 142 may be a first ball sleeve having a first rack gear 134a, and a second ball sleeve, having a second rack gear 134b, at least partially surrounds an outer circumference of the ball nut 126 at a location spaced radially apart from the first ball sleeve. The term "radially" is used herein to indicate a distance about a circumference of the ball nut 126. In this additional, split-sleeve configuration, a plurality of ball sleeves 142 could be attached (e.g., via fasteners 144) at different locations on the ball nut 126 to place the rack gears 134 into the desired orientations and positions with respect to the ball nut 126.

The "split" or "dual" rack gear 134 and sector gear 138 arrangement shown in FIGS. 1-2 and 4 may have certain features which are not present in the prior art arrangement of FIG. 3. For example, the split/dual arrangement can help with packaging of the electric power steering apparatus 100. Namely, the ball screw 118 diameter of the electric version is increased from the prior art hydraulic version, to handle the forces previously developed hydraulically. To fit the ball nut 126 around the larger-diameter ball screw 118 within a similarly sized housing 114, the ball nut 126 may have a reduced thickness and thus lower strength. The ability of the ball screw 118 to be "cradled" at least partially laterally between the first and second rack gears 134b (as evidenced by root-to-root line RR and described above) can help reduce the box center distance and/or avoid some of the thickness reduction of the ball nut 126, both of which can be desirable for packaging and/or durability reasons.

Additionally, a split/dual gear arrangement such as that described and shown herein can allow for a larger pitch radius in the rack gears 134 and/or sector gears 138, which can either provide higher torque for the same ball screw 118 force, or reduce the force needed by the ball screw 118 to generate the same amount of torque to help turn the output shaft 102 as desired. In a related feature, by reducing the distance from the rack gear teeth 136 to the ball screw 118 axis BA, the force transfer may generate a lower moment back into the ball screw 118 system, which reduces stress on the components of the electric power steering apparatus 100. This geometric change can also facilitate different tooth designs which can be used to reduce the separation forces as desired.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

We claim:

1. An apparatus for use in turning steerable vehicle wheels, comprising:
   a rotatable output shaft that is selectively rotatable to effect turning movement of at least one vehicle wheel;
   a housing supporting the output shaft for rotation relative thereto about a shaft axis;
   a first rotational input assembly for transmitting a steering command from a steering control member to the output shaft; and
   a power transmitting mechanism located within the housing and being configured to transmit a rotational force from the input assembly to the output shaft, the power transmitting mechanism including
      a plurality of sector gears, each sector gear being operatively connected to the output shaft at a lateral spacing from each other, and each said sector gear including sector gear teeth,
      a ball screw having longitudinally separated first and second ball screw ends, and
      a ball nut having a plurality of rack gears, each rack gear being operatively connected to the ball nut at a lateral spacing from each other, each said rack gear including rack gear teeth configured for selective engagement with corresponding sector gear teeth, and the ball nut being operatively engaged with the ball screw;
   wherein the rotational force from the input assembly turns the ball screw, and the ball nut reciprocates within the housing responsive to rotation of the ball screw to move each of the plurality of rack gears in a longitudinal direction, such that longitudinal motion of the rack gear teeth responsively drives the sector gear teeth and thereby transmits the steering command to the output shaft through toothed engagement between each said rack gear and the corresponding sector gear.

2. The apparatus of claim 1, including a second rotational input assembly operatively connected with the output shaft, the second rotational input assembly being configured to apply a rotational force from an input rotator indirectly to the output shaft.

3. The apparatus of claim 2, wherein the power transmitting mechanism translates power from the input rotator, having an input rotator axis, to the shaft axis, which is perpendicular to, and transversely offset from, the input rotator axis.

4. The apparatus of claim 2, wherein the input rotator is an electrically powered input rotator.

5. The apparatus of claim 2, wherein the ball screw extends collinearly with the input rotator.

6. The apparatus of claim 1, including at least one ball interposed between an external helical raceway of the ball screw and an internal helical raceway of the ball nut for transmitting forces therebetween.

7. The apparatus of claim 1, wherein at least a portion of the ball screw is interposed laterally between at least a portion of each of the plurality of rack gears.

8. The apparatus of claim 1, wherein a selected rack gear of the plurality of rack gears has a different lateral dimension than an other rack gear of the plurality of rack gears.

9. The apparatus of claim 1, wherein a selected sector gear of the plurality of sector gears has a different lateral dimension than an other sector gear of the plurality of sector gears.

10. The apparatus of claim 1, wherein at least one rack gear of the plurality of rack gears is integrally formed as a single unitary component with the ball nut.

11. The apparatus of claim 1, wherein at least one rack gear of the plurality of rack gears is provided on a ball sleeve that at least partially surrounds an outer circumference of the ball nut.

12. The apparatus of claim 11, wherein the ball sleeve is a first ball sleeve having a first rack gear, and a second ball sleeve, having a second rack gear, at least partially surrounds an outer circumference of the ball nut at a location spaced radially apart from the first ball sleeve.

* * * * *